Patented Mar. 31, 1936

2,036,134

UNITED STATES PATENT OFFICE 2,036,134

PROCESS FOR THE MANUFACTURE OF 1:2-DIAMINOBENZENE

Charles Graenacher and Richard Sallmann, Basel, Switzerland, assignors to the firm Society of Chemical Industry in Basle, Basel, Switzerland No Drawing. Application April 10, 1935, Serial No. 15,725. In Switzerland April 12, 1934

4 Claims. (Cl. 260—130.5)

It has been found that the 1:2-diaminobenzene may be obtained in advantageous manner from 1:2-dichlorobenzene by treating the latter at temperatures lying in the neighborhood of 150° C., and in the presence of copper, with aqueous ammonia in such a manner that at the end of the reaction the pressure of the water-ammonia system at 150° C. is at least 80 atmospheres absolute pressure. It is advantageous to proceed in such a manner that the aromatic halogen compound is treated a priori with such water-ammonia systems whose pressure at 150° C. is at least about 80 atmospheres absolute pressure, and that during the conversion the ammonia pressure is kept somewhat constant by addition of further quantities of ammonia. The copper is added to the reaction mass preferably in the form of a mixture of copper salts and metallic copper. It is essential that such a quantity of copper is present in the reaction mass that the main quantity of the 1:2-diaminobenzene formed can be separated in form of a complex copper salt. When the conversion is complete the 1:2-diaminobenzene is liberated by decomposition of the complex compound while simultaneously splitting off the copper in the form of copper sulfide.

The following example illustrates the invention, the parts being by weight unless otherwise stated:—

600 parts of ortho-dichlorobenzene, 250 parts by volume of aqueous ammonia, 30 parts of crystallized cupric chloride, and 70 parts of fragmentary copper are heated together in an autoclave at 140–150° C., while stirring. Ammonia is then forced into the autoclave until the pressure has risen to 100 atmospheres absolute pressure. After 10–20 hours the reaction is at an end, the ammonia absorbed during that period having been replaced by forcing ammonia two or three times into the vessel, so that the pressure is kept at 90–100 atmospheres absolute pressure throughout the whole of the reaction. After blowing off the ammonia there is added an aqueous solution of 150 parts of sodium sulfide and 680 parts by volume of a caustic soda solution of 30 per cent. strength, and the whole is heated at 110–115° C. for an hour. After blowing off the ammonia and filtering from the copper sulfide the filtrate is cooled, whereupon the ortho-diaminobenzene crystallizes. It can be purified by distillation in a vacuum.

The reaction mass can also be acidified and hydrogen sulfide introduced at boiling temperature until all the copper has been separated. It is then filtered and the ortho-diaminobenzene freed from the filtrate by sodium hydroxide.

Instead of adding the ammonia during the process, such a quantity of ammonia can be forced into the vessel already at the beginning that it is sufficient to produce the necessary pressure up to the end of the conversion. The further working up is the same as described above.

The proportion between copper and copper salts may also be varied within wide limits in every direction. The circumstances are particularly favorable when the quantity of copper metal exceeds considerably the quantity of copper salts. Instead of adding copper salts there may also be added such products to the reaction mass which cause the formation of copper salts in the course of the reaction, for example ammonium chloride or other ammonium salts, or these salts may be added in mixture with CuO.

What we claim is:—

1. Process for the manufacture of 1:2-diaminobenzene from 1:2-dichlorobenzene, consisting in treating the latter in the presence of copper at temperatures lying in the neighborhood of 150° C. with such water-ammonia systems in which the pressure at 150° C. is about 80 atmospheres absolute pressure, the pressure due to ammonia being kept substantially constant by addition of further quantities of ammonia.

2. Process for the manufacture of 1:2-diaminobenzene from 1:2-dichlorobenzene, consisting in treating the latter in the presence of copper at temperatures lying in the neighborhood of 150° C. with such water-ammonia systems in which the pressure at 150° C. is about 80 atmospheres absolute pressure, the pressure due to ammonia being kept substantially constant by addition of further quantities of ammonia, so much copper being used that the main quantity of the 1:2-diaminobenzene formed separates in the form of a complex copper salt.

3. Process for the manufacture of 1:2-diaminobenzene from 1:2-dichlorobenzene, consisting in treating the latter in the presence of copper in the form of a mixture of copper salts and copper at temperatures lying in the neighborhood of 150° C. with such water-ammonia systems in which the pressure at 150° C. is about 80 atmospheres absolute pressure, the pressure due to ammonia being kept substantially constant by addition of further quantities of ammonia.

4. Process for the manufacture of 1:2-diaminobenzene from 1:2-dichlorobenzene, consisting in treating the latter in the presence of copper in the form of a mixture of copper salts and copper at temperatures lying in the neighborhood of 150° C. with such water-ammonia systems in which the pressure at 150° C. is about 80 atmospheres absolute pressure, the pressure due to ammonia being kept substantially constant by addition of further quantities of ammonia, so much copper being used that the main quantity of the 1:2-diaminobenzene formed separates in the form of a complex copper salt.

CHARLES GRAENACHER.
RICHARD SALLMANN.